United States Patent [19]
Yanagimoto

[11] Patent Number: 5,582,056
[45] Date of Patent: Dec. 10, 1996

[54] INSTALLATION FOR CUTTING A KNIFE MATERIAL

[75] Inventor: Chuji Yanagimoto, Yao, Japan

[73] Assignee: Itami Industrial Co., Ltd., Yao, Japan

[21] Appl. No.: 339,707

[22] Filed: Nov. 14, 1994

[51] Int. Cl.$^6$ .................... B21D 28/00; B21D 43/24
[52] U.S. Cl. .................... 72/324; 72/294; 72/424; 83/76.1; 83/409; 83/417; 271/9.12; 271/10.01; 271/18.1; 414/797.1
[58] Field of Search .................... 72/424, 294, 324; 83/417, 451, 409, 917, 76.1, 360; 271/9.05, 9.07, 9.12, 10.01, 18.1, 267; 414/796.9, 797, 797.1

[56] References Cited

U.S. PATENT DOCUMENTS

| | | | |
|---|---|---|---|
| 3,140,088 | 7/1964 | Sykes | 271/10.01 |
| 3,914,154 | 10/1975 | Pfeiffer | 271/9.12 |
| 4,067,458 | 1/1978 | Schneider | 271/9.12 |
| 4,260,310 | 4/1981 | Blake | 414/797 |

FOREIGN PATENT DOCUMENTS

| | | | |
|---|---|---|---|
| 871625 | 1/1942 | France | 83/417 |
| 2040274 | 2/1972 | Germany | 83/409 |
| 147728 | 5/1992 | Japan | 72/424 |

*Primary Examiner*—Daniel C. Crane
*Attorney, Agent, or Firm*—Armstrong, Westerman, Hattori, McClelland & Naughton

[57] ABSTRACT

An installation for cutting a knife material which accurately cuts and produces an intermediate knife material to be supplied to a bending device for bending and forming a knife for working a sheet body. The installation is provided with a repository member horizontally stocking different kinds of assorted and piled knife materials, a conveyance conveying the knife materials at the repository member to a predetermined spot one by one from the uppermost material, a receiving mechanism horizontally receiving the knife material dropped from the conveyance, an inductive guidance mechanism adjusting the knife material to a proper position and guiding the longitudinal traveling of the knife material, a feeding mechanism feeding the knife material to the longitudinal direction, and a cutter cutting the knife material fed by the feeding mechanism to a predetermined length and produce an intermediate knife material.

8 Claims, 12 Drawing Sheets

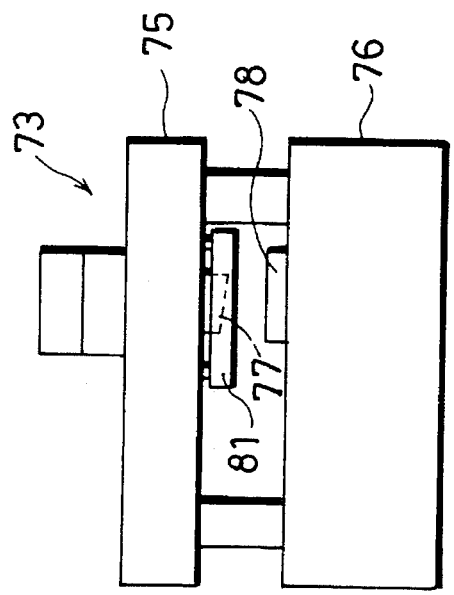
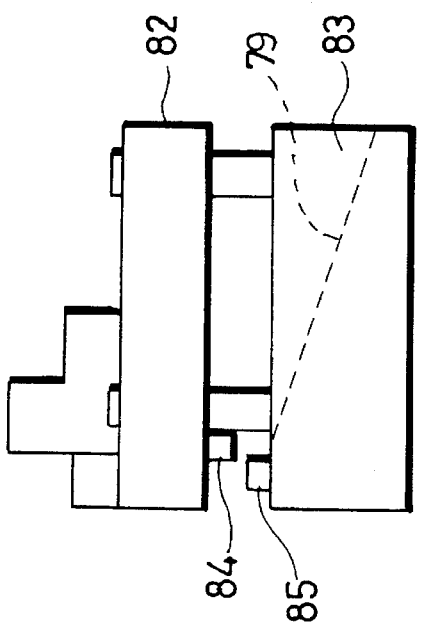
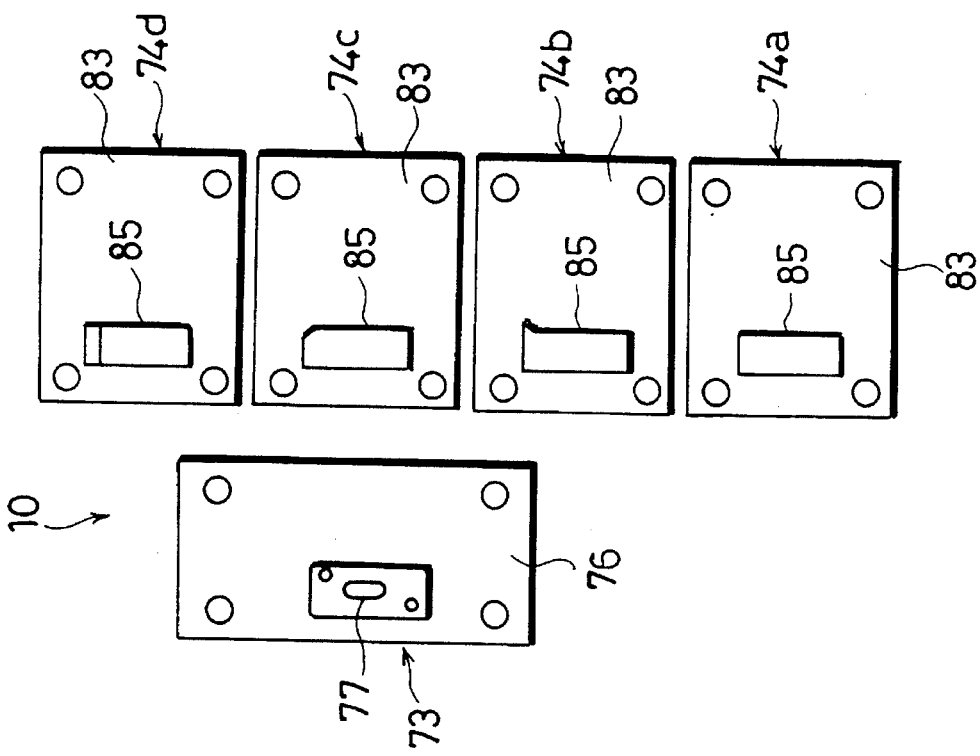

Fig.16
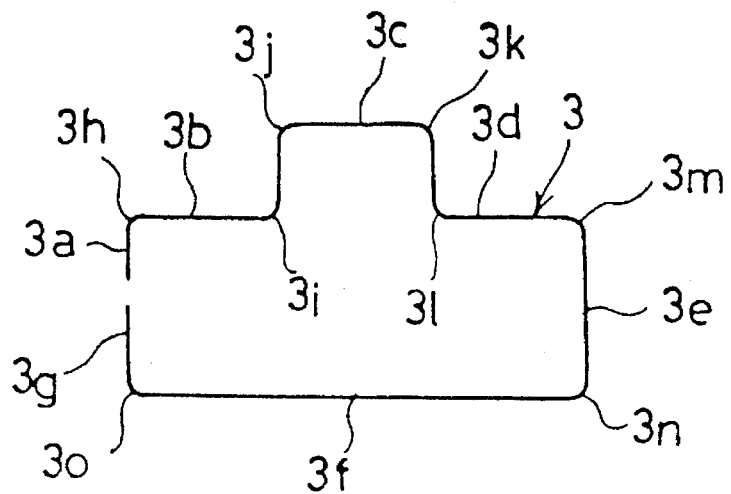
Fig.17
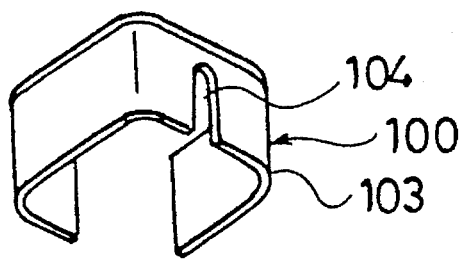
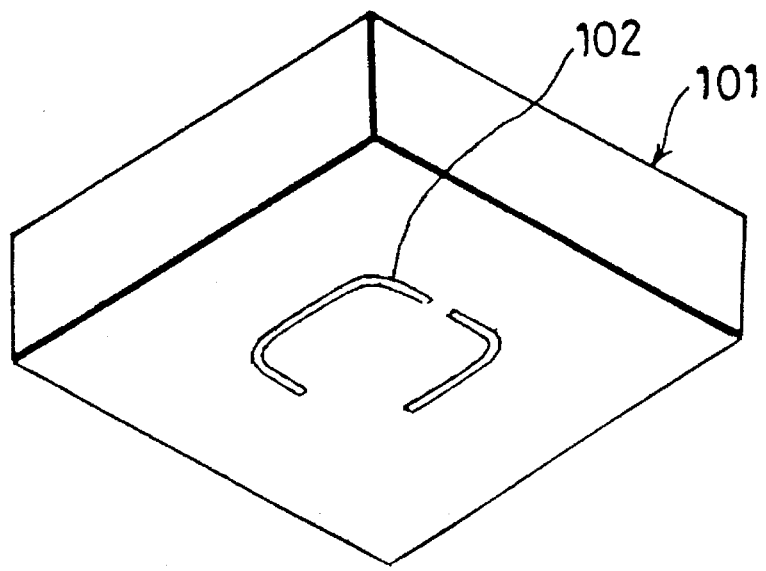

1

INSTALLATION FOR CUTTING A KNIFE MATERIAL

BACKGROUND AND SUMMARY OF THE INVENTION

The present invention relates to an installation for cutting a knife material which accurately cuts and forms an intermediate knife material to be supplied to a bending device for bending and producing a knife for working a sheet body.

A knife 100 for working a sheet body is, for example, fixed in a fitting groove 102 of a knife retainer 101 as shown in FIG. 17, and is used to form blankings or creases of various figures on a sheet body such as a corrugated board, a cardboard or the like.

In general, a knife for working a sheet body is produced by cutting a knife material in a band-shaped configuration to form an intermediate knife material of a predetermined length, feeding the intermediate knife material to a bending device, and bending the material to form a predetermined configuration by using the bending device.

A conventional method for forming a knife for working a sheet body therefore requires a cutting device for cutting a knife material to a predetermined length and a bending device for bending an intermediate knife material to a predetermined configuration.

Moreover, the cutting device requires taking a knife material from a repository member where knife materials of a certain length are kept and feeding the knife material to a cutter.

That is to say, a conventional installation as a whole is complicated because it requires taking the knife materials one by one from the repository member and feeding said knife material into the cutter to a predetermined proper position.

It is therefore an object of the present invention to provide an installation for cutting a knife material which can take out one knife material and certainly feed this knife material to a cutter, and also which installation as a whole is simple.

BRIEF DESCRIPTION OF THE DRAWINGS

FIG. 8 is a schematic plan view showing a notch cutter and a cutting cutter of a cutting means;

FIG. 9 is a schematic view showing the notch cutter;

FIG. 10 is a schematic view showing the cutting cutter;

FIG. 16 is a schematic plan view showing an embodiment of a knife for working a sheet body; and FIG. 17 is a perspective view showing an embodiment of a knife for working a sheet body and a knife retainer.

DESCRIPTION OF THE PREFERRED EMBODIMENTS

Preferred embodiments of the present will now be described with reference to the accompanying drawings.

Figure 1:
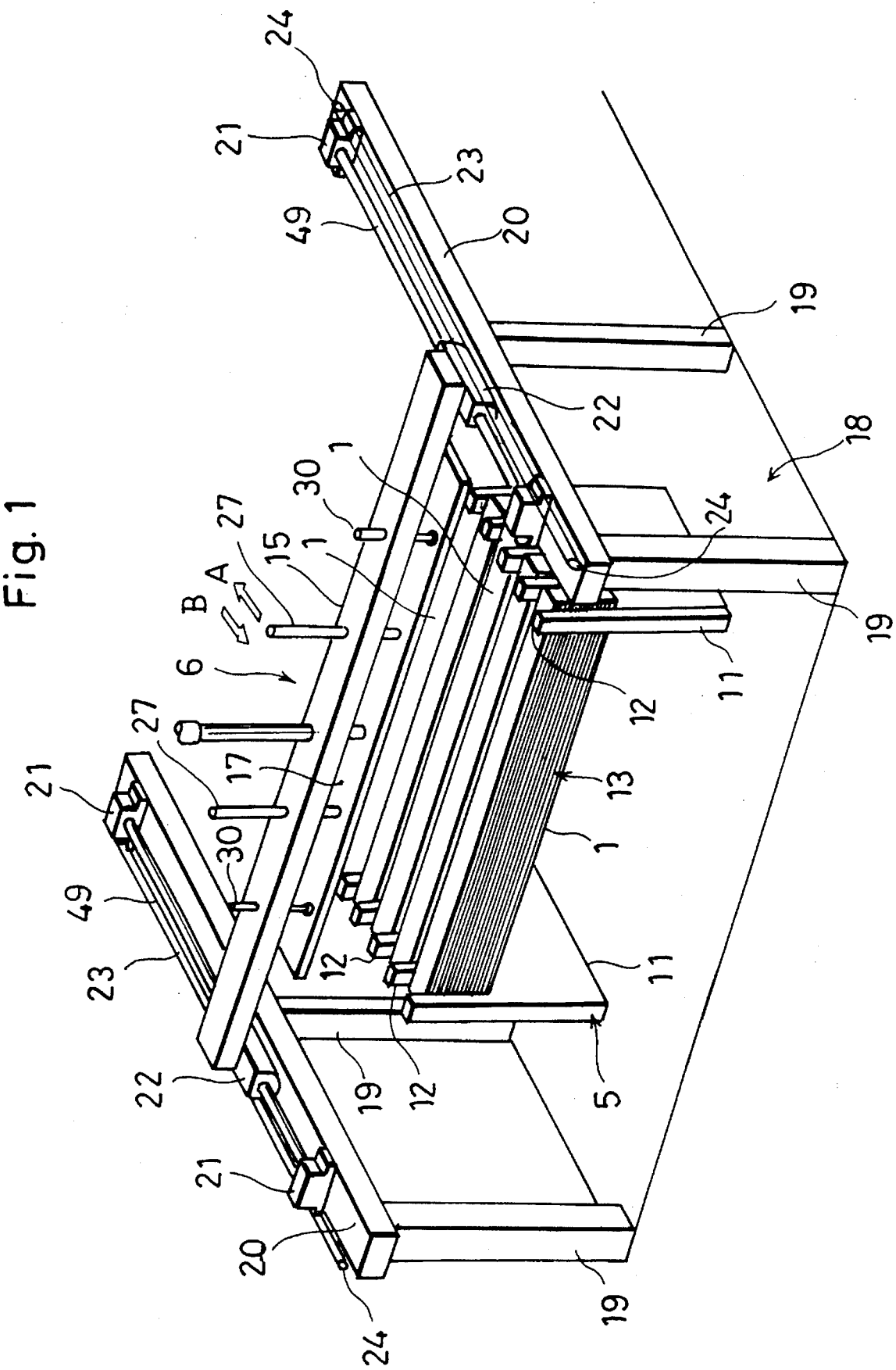
FIG. 1 is a schematic perspective view of an installation for cutting a knife material according to the present invention.

FIG. 1 shows a schematic view of an installation for cutting a knife material according to the present invention, which installation cuts a knife material 1 in a band-shaped configuration of a predetermined length in order to form an intermediate knife material 2 (see FIG. 11) of a predetermined length with high accuracy. The intermediate knife material 2 is bent to a predetermined configuration by a bending device which is not indicated in the accompanying drawings, and becomes a knife 100 for working a sheet body shown in FIG. 17.

A knife 100 for working a sheet body is to be fixed in a fitting groove 102 of a knife retainer 101 as shown in FIG. 17 in order to form a blanking hole (line) or a crease of a predetermined configuration.

The knife retainer 101 is, for example, made of plywood or other material, and the fitting groove 102 is, for example, formed by laser material processing with high accuracy. An intermediate knife material 2 is bent by a bending device in order to conform the intermediate knife material 2 to the shape of the fitting groove 102.

The knife 100 shown in FIG. 17 is provided with a notch portion 104 at a side marginal portion 103 thereof to form a bridge portion.

As shown in FIG. 1, the installation for cutting a knife material according to the present invention is provided with a repository member 5 horizontally stocking different kinds of assorted and piled knife materials 1, a conveyance means 6 conveying the knife materials 1 one by one from said repository member 5 to a predetermined spot and dropping the knife material 1 at the predetermined spot, a receiving mechanism 7 (see FIG. 3) horizontally receiving the dropped knife material 1, an inductive guidance mechanism 8 (see FIG. 3) guiding the longitudinal traveling of the knife material 1, a feeding mechanism 9 (see FIG. 3) feeding the knife material 1 to the longitudinal direction, and a cutting means 10 (see FIG. 8) cutting the knife material 1 fed by said feeding mechanism 9 to a predetermined length.

The repository member 5 is provided with a pair of parallel base plates 11, 11 which are arranged to be at a predetermined distance. A plurality of material fitting depressed portions 12, which openings are upward, are juxtaposed at the respective base plates 11, 11.

Stacking bodies 13, which are piles of knife materials 1, are fitted at the respective pairs of opposed material fitting depressed portions 12, 12 of the base plates 11, 11.

That is to say, a pair of opposed depressed portions 12, 12 form a storing portion 14 for fitting and storing a stacking body 13, and a plurality of storing portions 14 are arranged in parallel.

In this case, the knife materials 1 are assorted and stocked at the respective storing portions 14 according to the length, quality, thickness, and other conditions of the knife materials 1.

The conveyance means 6 is provided with a traverse bar 15 horizontally reciprocating in a plane that intersects the feeding direction of the knife materials 1 at right angles thereto, and a vertically movable adsorption plate 17 with magnets 16 (see FIG. 2), which adsorb a knife material 1, attached to the bottom surface 17a thereof.

A plurality of posts 19 are installed on a base 18, and a pair of parallel and horizontal supporting frames 20, 20 are placed on the posts 19. Rods 49 are arranged on the supporting frames 20 through supporting bodies 21, 21, and sliders 22 are fitted outside and run along the rods 49.

The both ends of the traverse bar 15 are each attached to the pair of sliders 22, 22, and said traverse bar 15 reciprocates as shown with the arrows A and B according to the reciprocating motion of the sliders 22, 22 along the rods 49, 49.

Parts of interlock members 23 such as endless belts or endless chains are attached to the sliders 22, 22, and according to the drive of the interlock members 23, the sliders 22, 22 slide and the traverse bar 15 reciprocates as shown with the arrows A and B.

The interlock members 23, 23 are each hitched on a pair of sprockets 24, 24, both of which are rotated by a motor not indicated in the accompanying drawings, to thereby allow the interlock members 23, 23 to drive.

Figure 2:
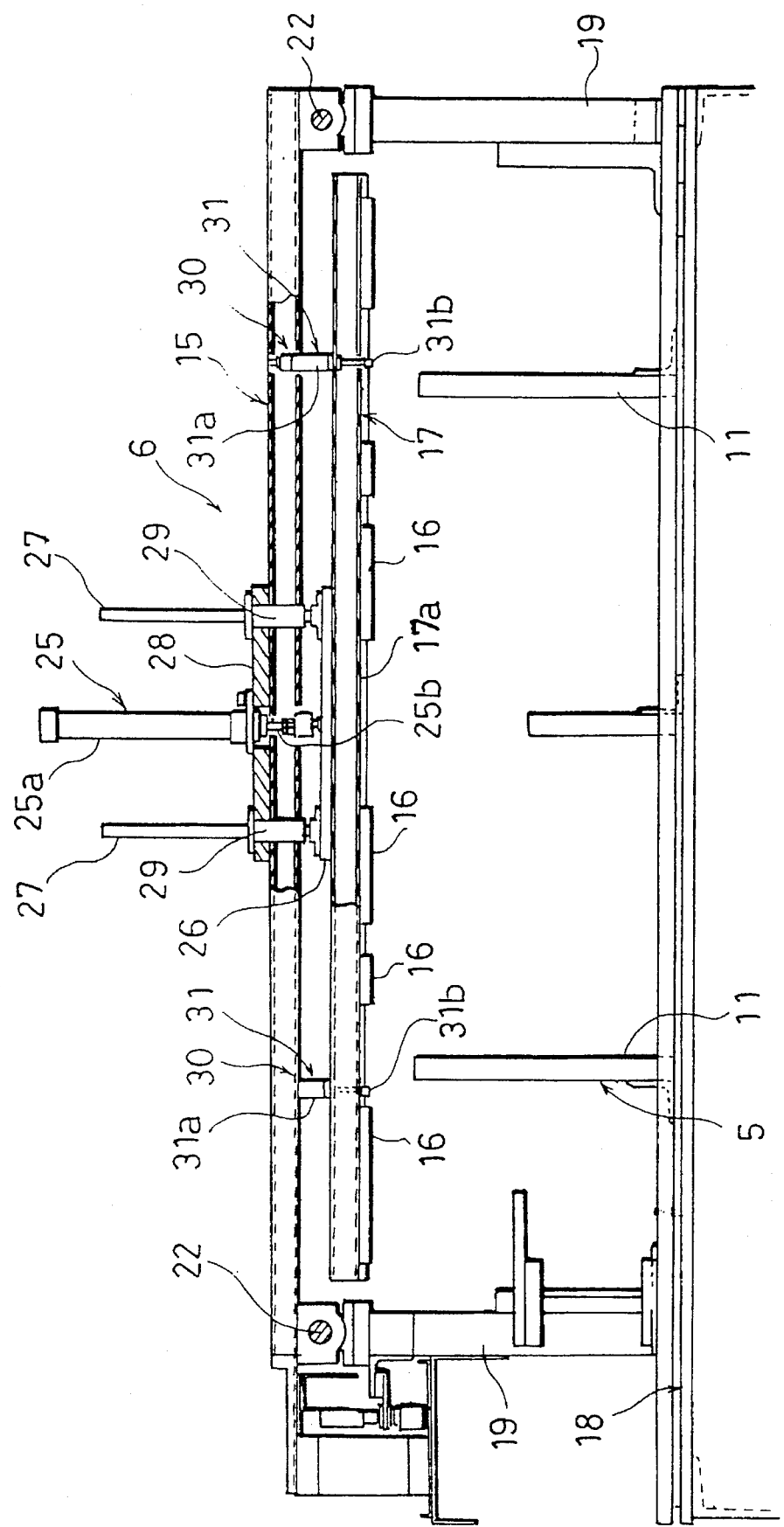
FIG. 2 is a fragmentary elevational view shown with portions broken away for clarity.

As shown in FIG. 2, the traverse bar 15 is furnished with a cylinder 25 for ascent and descent in order to move the adsorption plate 17 vertically. In other words, the main body 25a of the cylinder 25 for ascent and descent is attached to the traverse bar 15, and a piston rod 25b of the cylinder 25 is attached to the adsorption plate 17. A supporting plate 26 is placed on the adsorption plate 17, and a pair of guide rods 27, 27 are mounted on the supporting plate 26. Moreover, the traverse bar 15 is furnished with a cylinder installation plate 28, and bushes 29, 29 are fitted in the spaces between the installation plate 28 and the traverse bar 15.

That is to say, the guide rods 27, 27 installed on the supporting plate 26 project upward from the installation plate 28 through the bushes 29, 29.

Therefore, the adsorption plate 17 ascends and descends according to the expansion and contraction of the piston rod 25b (this piston rod 25b is attached to the supporting plate 26 of the adsorption plate 17) of the cylinder 25. Moreover, the adsorption plate 17 ascends and descends smoothly keeping horizontal owing to the guide of the guide rods 27, 27.

The conveyance means 6 is provided with pushing mechanisms 30, 30 which push and drop a knife material 1.

Each pushing mechanism 30 consists of a cylinder 31 having an telescopic rod 31b which projects downward lower than the bottom surfaces of the magnets 16 under the expanding situation. The main body 31a of the cylinder 31 is attached to the adsorption plate 17.

Figure 7A:
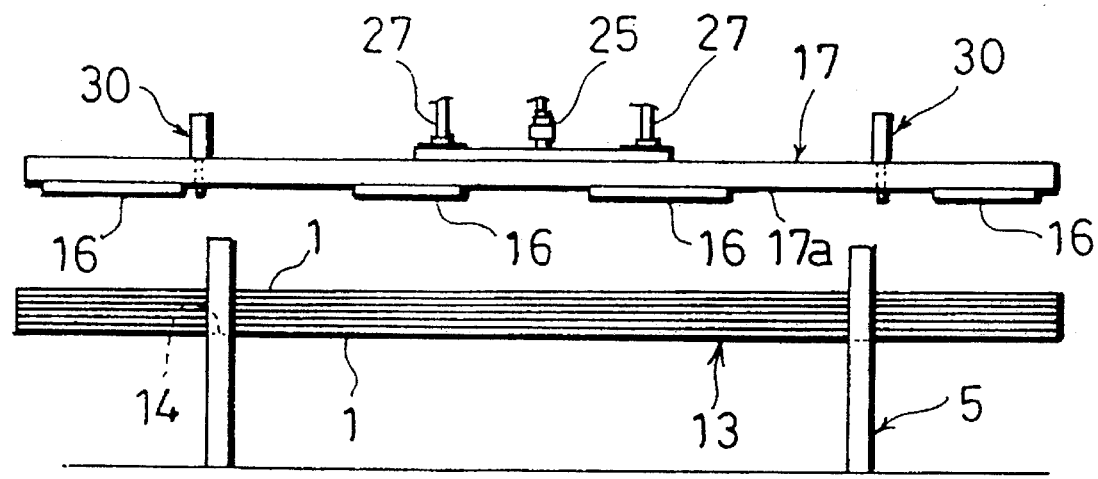
FIG. 7A is a schematic view showing a situation of conveying a knife material.
Figure 7B:
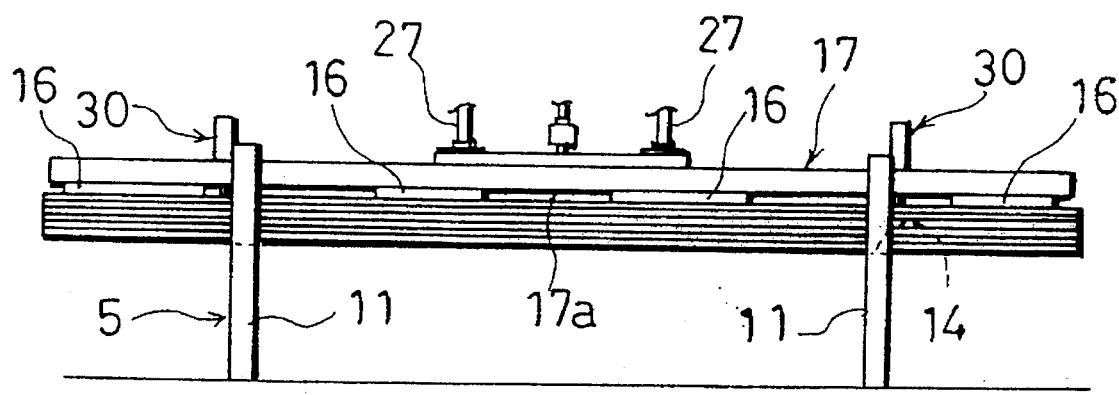
FIG. 7B is a schematic view showing a situation of conveying a knife material.

According to the conveyance means 6 described in the foregoing, the traverse bar 15 is moved in order to position the adsorption plate 17 over a stacking body 13 at one of the storing portions 14 of the repository member 5 as shown in FIG. 7A, the cylinder 25 is driven in order to descend the adsorption plate 17 as shown in FIG. 7B, and the magnets 16 adsorb the uppermost knife material 1 of the stacking body 13.

Figure 7C:
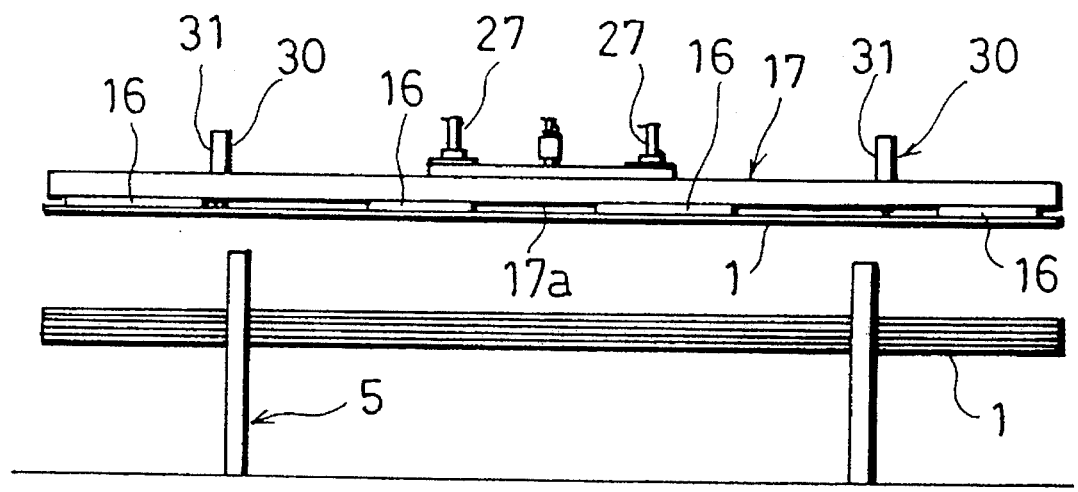
FIG. 7C is a schematic view showing a situation of conveying a knife material.

Provided the adsorption plate 17 is subsequently ascended as shown in FIG. 7C, only the uppermost knife material 1 is ascended a long with the adsorption plate 17, thereby allowing one knife material to be taken from the repository member 5.

Thereafter, the traverse bar 15 is moved, the knife material 1 is positioned at a predetermined position, the rods 31b of the cylinders 31 of the pushing mechanisms 30 are projected as shown with arrows, and the knife material 1 parts from the magnets 16 and drops downward as shown with the arrow D.

Figure 3:
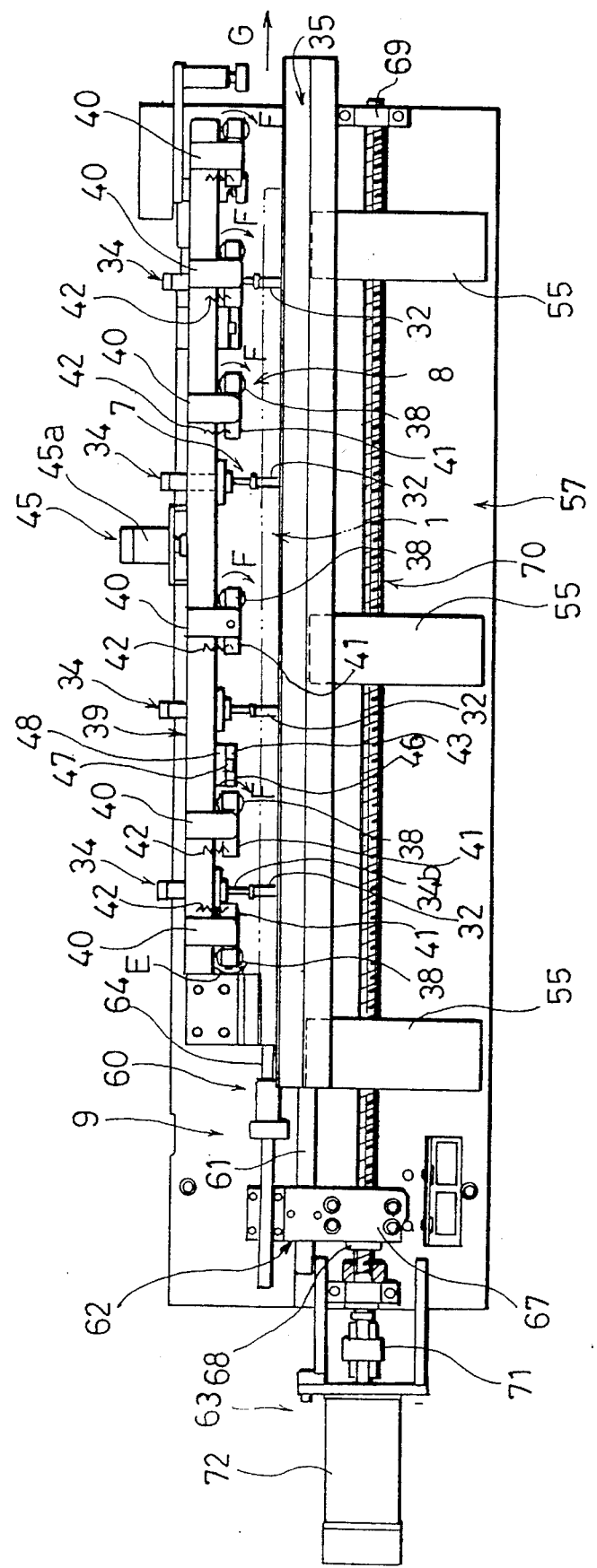
FIG. 3 is a fragmentary plan view.

The knife material 1 which has fallen off as shown with the arrow D is received by the receiving mechanism 7 shown in FIG. 3.

Figure 4:
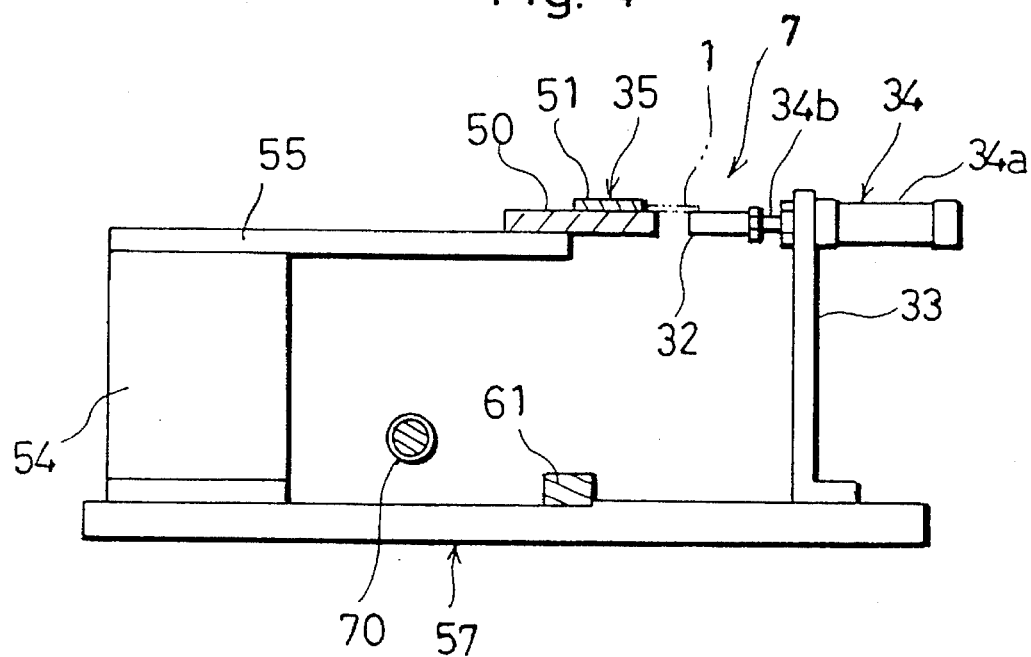
FIG. 4 is a sectional side view.

The receiving mechanism 7 is provided with rolls 32 each having a horizontal axis. As shown in FIG. 4, rolls 32 are installed at the respective ends of piston rods 34b of cylinders 34 which main bodies 34a are attached to a supporting plate 33 respectively. The supporting plates 33, four in number in illustration, are arranged on a base 57 along the feeding direction of the knife materials 1 at predetermined pitches. The axis of each roll 32 is in a plane that intersects the feeding direction of the knife materials 1 at right angles thereto.

Figure 6:
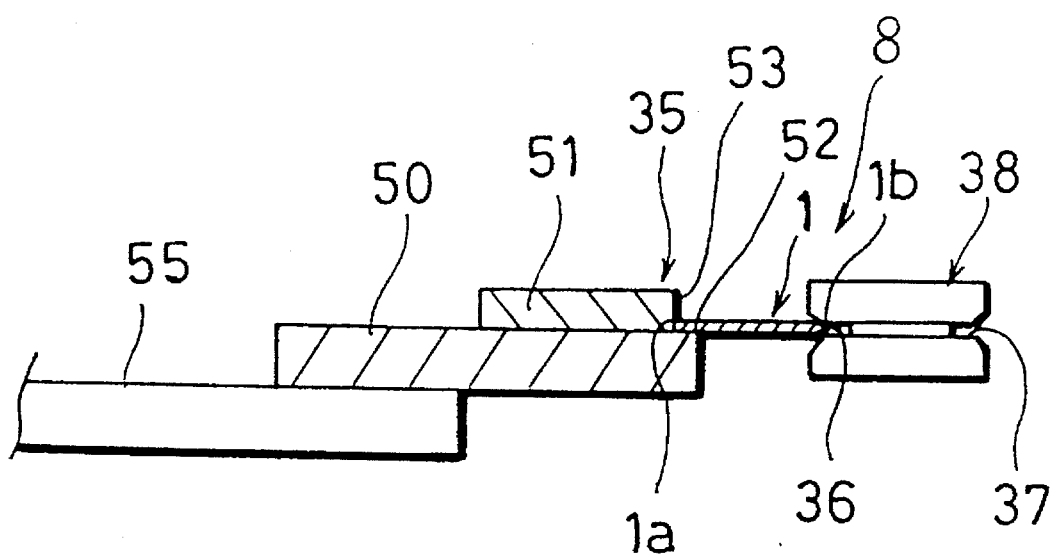
FIG. 6 is a fragmentary sectional view showing a situation of feeding a knife material.

The inductive guidance mechanism 8 is provided with a guide plate 35 where the back side marginal portion of the knife material 1 slides, and rollers 38 each having a depressed groove 37 in which the blade portion 36 of the knife material 1 is fitted (as shown in FIG. 6).

Figure 5:
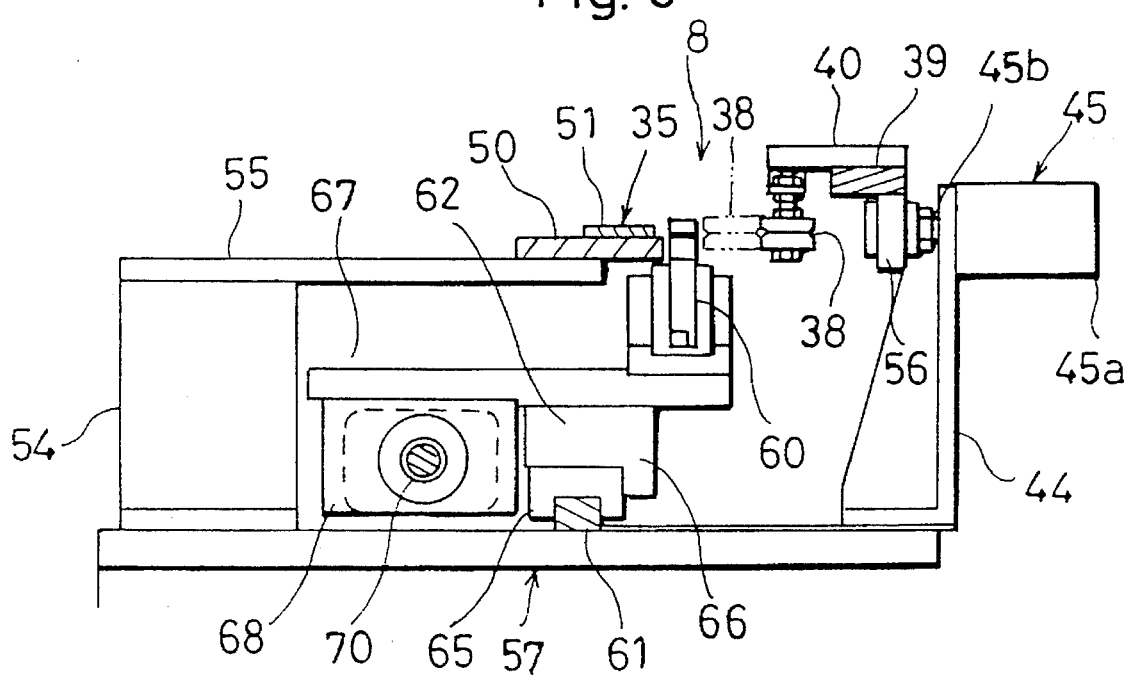
FIG. 5 is a sectional side view.

That is to say, as shown in FIG. 3 and FIG. 5, the inductive guidance mechanism 8 possesses a parallel plate 39 which reciprocates in a plane that intersects the feeding direction of the knife materials 1 at right angles thereto, and a plurality of roller holding pieces 40 are attached to the parallel plate 39, and an oscillation piece 41 is attached to each roller holding piece 40, which oscillation piece 41 is provided with a roller 38.

Specifically, parts of the roller holding pieces 40 project toward the rolls 32, and the oscillation pieces 41 are pivoted and supported at the projections through pivots in order to let the oscillation pieces 41 oscillate in a horizontal plane. The oscillation piece 41 at the uppermost stream is furnished with a roller 38, which can roll freely, at the upstream side marginal portion thereof, and an elastic member 42, which is connected to the parallel plate 39, at the downstream side marginal portion thereof.

The other oscillation pieces 41 are respectively furnished with a roller 38, which can roll freely, at the downstream side marginal portion thereof and an elastic member 42, which is connected to the parallel plate 39, at the upstream side marginal portion thereof.

The roller 38 of the oscillation piece 41 at the uppermost stream is bounced toward the direction of the arrow E (i.e. the direction parting from the parallel plate 39) by the elasticity of the elastic member 42. The rollers 38 of the other oscillation pieces 42 are bounced toward the direction of the arrow F (i.e. the direction parting from the parallel plate 39) by the elasticity of the elastic members 42.

Being guided by a plurality of (two in illustration) linear guides 43, the parallel plate 39 horizontally reciprocates in a plane that intersects the feeding direction of the knife materials 1 at right angles thereto. In other words, as shown in FIG. 5, a holding frame 44 is placed on the base 57, a main body 45a of a cylinder 45 for driving the parallel plate 39 is attached to the holding frame 44, and a piston rod 45b of the cylinder 45 is attached to the parallel plate 39 through a coupling device 56.

Therefore, according to the expansion and contraction of the piston rod 45b of the cylinder 45, the parallel plate 39 is guided by the linear guides 43 and reciprocates in parallel. Incidentally, each linear guide 43 is provided with a supporting frame 46 placed on the base 57, a rail 47 installed on said supporting frame 46, and a fitting body 48 having a fitting groove that fits to said rail 47, which fitting body 48 is attached to the parallel plate 39.

As shown in FIGS. 4 to 6, the guide plate 35 comprises a main body plate 50 and a secondary plate 51 which is fixed on said main body plate 50, and the back side marginal portion of the knife material 1 is laid on the upper marginal portion 52 at the end portion of the main body plate 50 at the parallel plate 39 side, and the back side marginal end 1a of said knife material 1 contacts the inner marginal end 53 of the secondary plate 51.

In this case, the upper surface of the main body plate 50 of the guide plate 35 is arranged to be at the same height position with the upper marginal end of the rolls 32.

The guide plate 35 is attached to a horizontal plate 55 of a supporting frame 54 placed on the base 57.

According to the receiving mechanism 7 composed as described in the foregoing, the knife material 1 dropped from the conveyance means 6 can be horizontally received by a plurality of rolls 32 of the receiving mechanism 7.

The knife material 1 received by the receiving mechanism 7 is kept horizontal, however, the knife material 1 is not always positioned at the proper position shown with an imaginary line, and is slant to the feeding direction in some cases.

Therefore, if the parallel plate 39 approaches the guide plate 35 while the knife material 1 is horizontally received by the rolls 32, the blade portion 1b of the knife material 1 fits to the depressed grooves 37 of the rollers 38, said knife material 1 is gradually pressed toward the guide plate 35 side, and finally, as shown in FIG. 6, the knife material 1 becomes parallel to the feeding direction with the side end portion being placed on the upper marginal portion 52 of the guide plate 35 and the side end 1a touching the inner marginal end of the secondary plate 51.

As shown in FIG. 3 and FIG. 5, the feeding mechanism 9 is provided with a chuck member 60 chucking the rear end portion of the knife material 1, a guide rail 61 arranged to be parallel to said feeding direction, a shift member 62 shifting along said guide rail 61, and a traveling drive member 63 making said shift member 62 travel along the guide rail 61.

The chuck member 60 possesses a chucking click 64 which opens and closes according to air pressure, and the rear end portion of the knife material 1 is chucked when the chucking click 64 is closed.

The guide rail 61 is arranged on the base 57, and a slide body 65 of the shift member 62 fits to the guide rail 61 and slides freely. The slide body 65 is attached to a coupling plate 67 through a block body 66, and a nut member 68 and the chuck member 60 are attached to the coupling plate 67.

A screw shaft 70, which is arranged to be parallel to the feeding direction, fits into the nut member 68. An end portion (the upstream end portion) of the screw shaft 70 is interlocked to an output shaft of a driving motor 72 through an interlock connecting member 71 such as a coupling or the like, and the other end portion (the downstream end portion) is pivoted and supported by a bearing member 69.

That is to say, the drive member 63 comprises the driving motor 72, screw shaft 70, interlock connecting member 71, and so forth, and when the driving motor 72 drives to rotate the output shaft, the screw shaft 70 rotates about the axis thereof, the nut member 68 screws to move forward and backward along the screw shaft 70, and the shift member 62 reciprocates along the axis of the screw shaft 70. In other words, the chuck member 60 reciprocates along the feeding direction of the knife materials 1 according to the reciprocating motion of the shift member 62 along the axis of the screw shaft 70.

Therefore, as shown in FIG. 3, after the shift member 62 is positioned at the upstream side and the chuck member 60 chucks the rear end portion of the knife material 1, if the driving motor 72 drives to make the shift member 62 advance (slide to the downstream side), the knife material 1 chucked by the chuck member 60 is fed along the feeding direction as shown with the arrow G.

If the knife material 1 advances toward the arrow G, the chuck member 60 is threatened with bumping against the rolls 32 which are receiving the knife material 1, however, because rolls 32 are attached to the respective piston rods 34b of the cylinders 34, the chuck member 60 can travel without bumping against the rolls 32 if the piston rods 34b are withdrawn.

Moreover, when the chuck member 60 passes by, the chuck member 60 pushes the rollers 38 toward the opposite direction of the guide plate 35, and the rollers 38 can resist the elasticity of the elastic members 42 and avoid the chuck member 60, because the rollers 38 are pivoted and supported by the oscillation pieces 41 so that the rollers 38 can oscillate freely, and are bounced toward the guide plate 35 side by the elasticity of the elastic members 42.

Therefore the chuck member 60 can travel along the feeding direction of the knife materials 1 without being disturbed by the rollers 38 and rolls 32, and the knife material 1 is fed along the feeding direction toward the arrow G being kept horizontal by the receiving mechanism 7 and the inductive guidance mechanism 8.

The knife material 1 is thus fed to the cutting means 10 and cut by the cutting means 10 to a predetermined length.

The cutting means 10 is provided with a notch cutter 73 and several (four in illustration) kinds of cutting cutters 74 as shown in FIG. 8.

Figure 11:
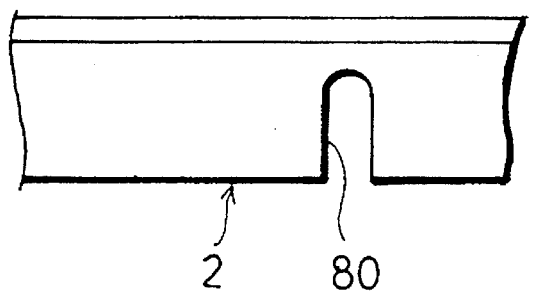
FIG. 11 is a plan view of an intermediate knife material.

As shown in FIG. 9, the notch cutter 73 is provided with an upper die 75, a lower die 76, an upper blade 77 attached to the upper die 75, and a lower blade 78 attached to the lower die 76. The upper blade 77 is lowered on the knife material 1 interposed between the upper blade 77 and the lower blade 78 in order to form a notch portion 80 as shown in FIG. 11. By way of parenthesis, the 81 in FIG. 9 is a stripping plate.

The cutting cutters of four kinds, 74a, 74b, 74c, and 74d are respectively provided with an upper die 82, a lower die 83, an upper blade 84 attached to the upper die 82, and a lower blade 85 attached to the lower die 83 as shown in FIG. 10. The upper blade 84 is lowered in order to cut the knife material 1 interposed between the upper blade 84 and the lower blade 85.

In this case, the cutter 74a is for "creasing", the cutter 74b is for "lipping", the cutter 74c is for "verse lipping", and the cutter 74d is for "vertical cutting".

Figure 12A:
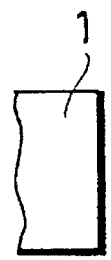
FIG. 12A is a plan view of a knife material cut with a creasing cutter.
Figure 12B:
FIG. 12B is a plan view of a knife material cut with a lipping cutter.
Figure 12C:
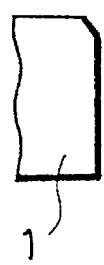
FIG. 12C is a plan view of a knife material cut with a reverse lipping cutter.
Figure 12D:
FIG. 12D is a plan view of a knife material cut with a vertical cutting cutter.

That is to say, the cutting end shown in FIG. 12A can be obtained if the knife material 1 is cut with the cutter 74a, the cutting end shown in FIG. 12B can be obtained if the knife material 1 is cut with the cutter 74b, the cutting end shown in FIG. 12C can be obtained if the knife material 1 is cut with the cutter 74c, and the cutting end shown in FIG. 12D can be obtained if the knife material 1 is cut with the cutter 74d.

The cutters 74a, 74b, 74c, and 74d are arranged along the direction transversing the feeding direction at a right angle thereof, and they can be changed by reciprocating in the direction transversing the feeding direction at a right angle thereof according to a reciprocating motion mechanism which is not indicated in the accompanying drawings.

A slope portion 79 is formed in each of the lower dies 83 of the cutters 74a, 74b, 74c, and 74d as shown in FIG. 10, and an intermediate knife material 2 is stored through the slope portion 79 into an intermediate material storing container which is not indicated in the accompanying drawings.

The notch cutter 73 can be moved in the direction transversing the feeding direction of the knife materials 1 at a right angle thereof. In other words, as shown in FIG. 13, the notch cutter 73 laid on a base 86 can slide freely, and a piston rod 87b of a cylinder 87 is attached to the lower die 76.

Figure 13:
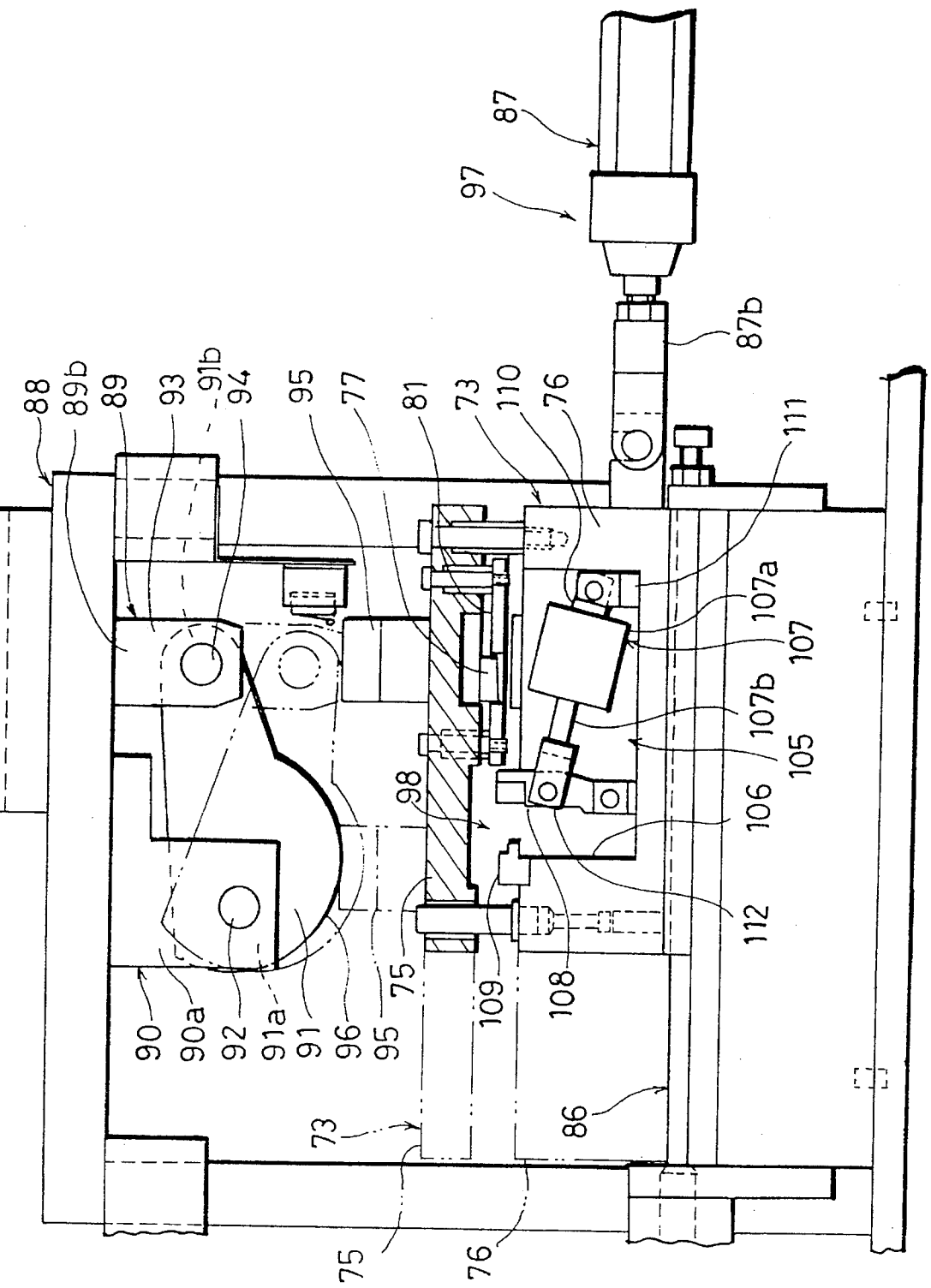
FIG. 13 is a side view showing a driving mechanism.

If the piston rod 87b of the cylinder 87 extends from the situation shown with a solid line in FIG. 13, the cutter 73 moves as shown with imaginary lines, and if the piston rod 87b withdraws from this situation, the cutter 73 returns to the position shown with solid lines.

Incidentally, a cylinder supporting plate 88 installed on the base 86 supports a cylinder 89. The supporting plate 88 is furnished with a hanging portion 90 having a pair of holding between piece portions 90a, 90a, between which a basic end portion 91a of an oscillation piece 91 is interposed and is pivoted and supported by a pivot 92. The terminal end portion 91b of the oscillation piece 91 is interposed between a pair of holding between piece portions 93, 93 of the piston rod 89b of the cylinder 89 and is pivoted and supported by a pivot 94.

The block body 95 is attached to the upper die 75 of the cutter 73, and the oscillation piece 91 presses the block body 95 to lower the upper die 75.

That is to say, if the piston rod 89b of the cylinder 89 extends with the cutter 73 positioned at the place shown with imaginary lines, the oscillation piece 91 oscillates as shown with an imaginary line, and an expansion portion 96 at the basic end portion of the oscillation piece 91 pushes the block body 95 down to lower the upper die 75.

If the chuck member 60 gradually advances when the cutter 73 is positioned at the place shown with imaginary lines, the chuck member 60 touches to the notch cutter 73 and the advancement is restricted. This increases a lot of throw-away material and is not desirable.

For this reason, the cutter 73 is moved as shown with solid lines in FIG. 13 by a driving mechanism 97 consisting of said cylinder 87 in order to form a chuck member passage 98 where the chuck member 60 can pass through.

Therefore the chuck member 60 can approach to the cutters 74a, 74b, 74c, and 74d, and the throw-away material can be curtailed within the limits of the possibility.

When the knife material 1 is cut with the cutters 74a, 74b, 74c, or 74d, said knife material 1 is fixed at a fixing member 105.

The fixing member 105 is provided with a cylinder 107 contained in a notch depression 106 of the lower die 76, an oscillation piece 108 connected with a piston rod 107b of the cylinder 107, and a receiving block 109 attached to the lower die 76.

That is to say, a pivot piece 110 projects from the main body 107a of the cylinder 107, and is pivoted and supported through a pin by a supporting frame body 111 arranged at the notch depression 106.

The piston rod 107b of the cylinder 107 is connected with a coupling piece 112, which is connected with the oscillation piece 108 through a pin.

Therefore, when the piston rod 107b of the cylinder 107 extends, the oscillation piece 108 approaches the receiving block 109, and the knife material 1 can be fixed and supported by the receiving block 109 and the oscillation piece 108.

The knife material 1 can be thus firmly fixed by the chuck member 60 and the fixing member 105, to thereby ensure the last cutting operation.

Figure 14:
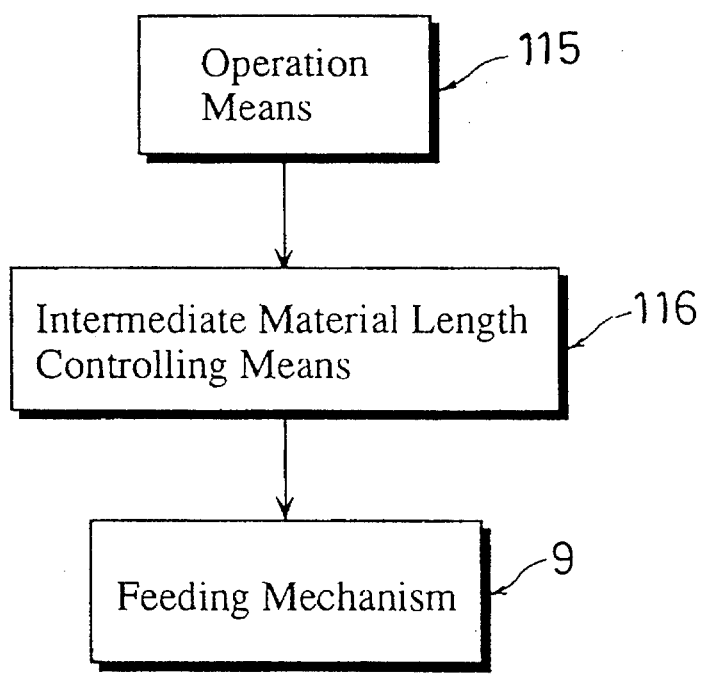
FIG. 14 is a block diagram.

This installation for cutting a knife material is provided with an operation means 115 operating a predetermined length of an intermediate knife material 2 and an intermediate material length controlling means 116 adjusting the quantity of the knife material 1 to be fed by the feeding mechanism 9 as shown in FIG. 14.

The operation means 115 is used to determine a predetermined length of an intermediate knife material 2 to be fed to the bending device on the basis of the quality of the knife material 1 and the configuration and the finished length of the knife to be formed.

For example, if the configuration of a finished knife 3 is the plane view in FIG. 16, said predetermined length is the sum of the measured lengths of the respective sides 3a, 3b, 3c, 3d, 3e, 3f, and 3g, and the respective corner portions 3h, 3i, 3j, 3k, 3l, 3m, 3n, and 3o and the extended quantity of the material which is caused by bending the material in order to form the corner portions 3h, 3i, 3j, 3k, 3l, 3m, 3n, and 3o.

The value operated by the operation means 115 is sent to the intermediate material length controlling means 116, where the quantity of the knife material 1 to be fed by the feeding mechanism 9 is determined on the basis of the operated value, and said feeding mechanism 9 is commanded to feed the knife material 1 toward the feeding direction to the determined feeding quantity.

Therefore the knife material 1 controlled by the intermediate material length controlling means 116 and fed by the feeding mechanism 9 is cut to said predetermined length by the cutting means 10, and the intermediate knife material 2 to be fed to the bending device possesses the predetermined length, and the knife 3 which was bent and formed by the bending device possesses the configuration and the finished length of the knife to be produced.

Figure 15:
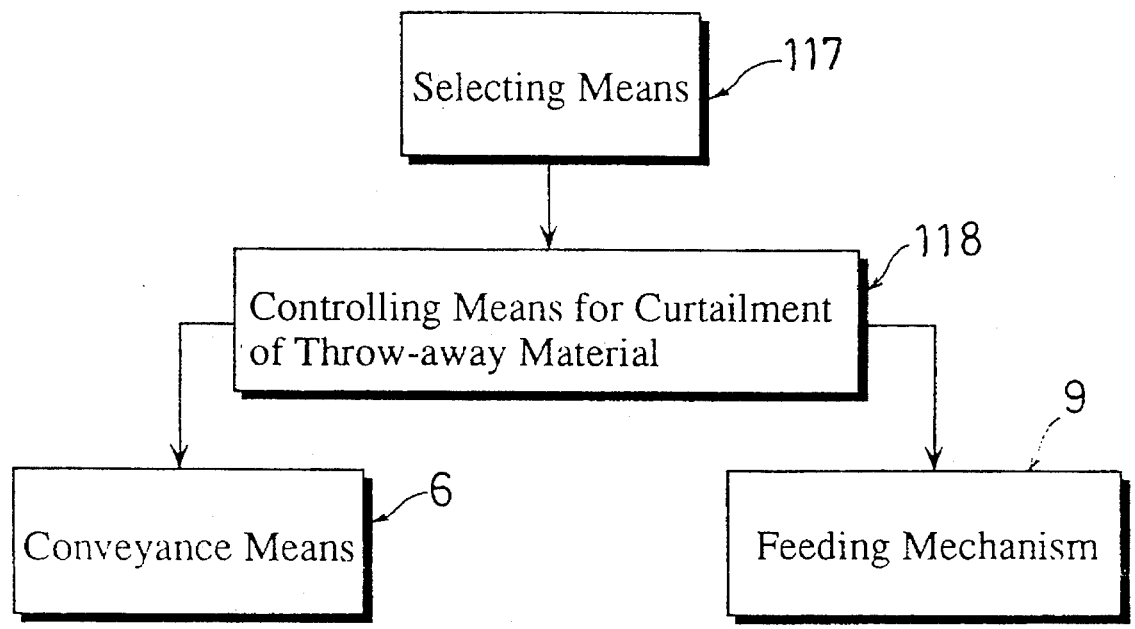
FIG. 15 is a block diagram.

This installation is, as shown in FIG. 15, provided with a selecting means 117, which selects a knife material 1 and a position to be cut, and a controlling means 118 for curtailment of throw-away material, which adsorbs and conveys the knife material 1 selected by said selecting means 117 and controls the quantity of the knife material 1 to be fed by the feeding mechanism 9.

The selecting means 117 is used when many knives 3 of various finished lengths are to be formed, and said selecting means 117 selects a knife material 1 from the knife materials 1 of different lengths and a position to be cut on the basis of the finished lengths and the numbers of each kind of knives 3.

A knife material 1 and a position to be cut are selected by the selecting means 117, because if the knife materials 1 are taken at random from the repository member 5 and fed to the cutting means 10, a great amount of throw-away material remains after the knife materials 1 are cut by the cutting means 10, and this is not favorable in view of curtailment of material.

The controlling means 118 for curtailment of throw-away material therefore makes the conveyance means 6 adsorb and convey the knife material 1 selected by the selecting means 117, and controls the quantity of the knife material 1 to be fed by the feeding mechanism 9 in order to minimize the amount of the throw-away material remaining after the knife materials 1 are cut by the cutting means 10.

Explained below is a method for producing an intermediate knife material 2 using the installation for cutting a knife material composed as described in the foregoing.

First, different kinds of knife materials 1 are stored in the repository member 5 so that they are assorted and placed horizontally.

Next, a knife material 1 is selected on the basis of the configuration, finished length, number, and other conditions of the knives 3 to be produced, the adsorption plate 17 is shifted to a position over the storing portion 14 of the repository member 5 where the knife material 1 is stored as shown in FIG. 7A, and the uppermost knife material 1 at the storing portion 14 is adsorbed and lifted as shown in FIG. 7C.

Figure 7D:
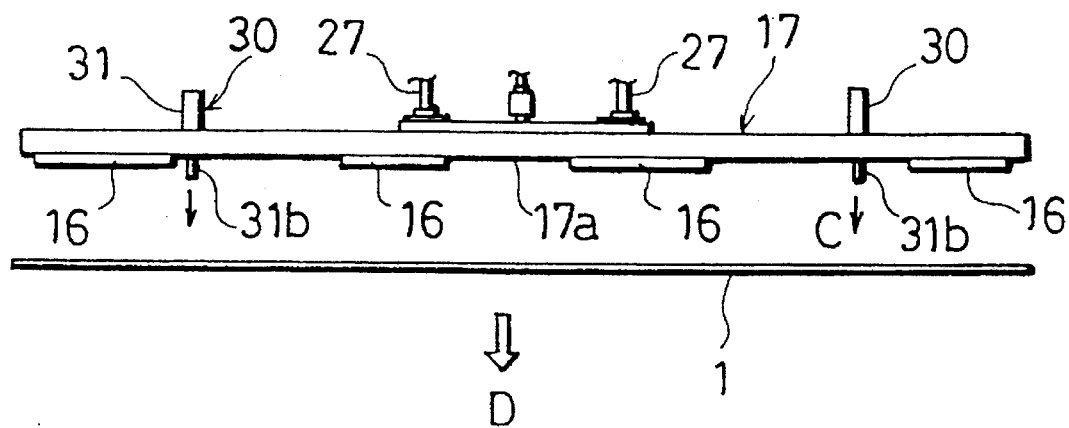
FIG. 7D is a schematic view showing a situation of conveying a knife material.

Subsequently, the conveyance means 6 is driven in order to convey the adsorbed knife material 1 to a position over the receiving mechanism 7, and under this situation, the piston rods 31b of the cylinders 31 of the pushing mechanisms 30 are extended in order to drop the knife material 1 toward the arrow D as shown in FIG. 7D.

In this case, the parallel plate 39 of the inductive guidance mechanism 8 needs to be kept apart from the guide plate 35 when the knife material 1 is received.

After the knife material 1 is received by the receiving mechanism 7, the parallel plate 39 approaches the guide plate 35 in order to hold the knife material 1 between a plurality of rollers 38 and the guide plate 35.

Under this situation, the rear end portion of the knife material 1 is chucked by the chuck member 60, and the driving motor 72 is driven in order to feed the knife material 1 gradually to the cutting means 10.

At this time, the feeding quantity is controlled, and the knife material 1 can be cut to a predetermined length after a notch portion 80 is formed by the cutting means 10.

Consequently, the most suitable knife materials 1 are selected one by one, and are successively fed to the cutting means 10, where notch portions 80 for bridge portions are formed and the knife materials 1 are cut to the respective predetermined lengths.

If the intermediate knife materials 2 produced as described in the foregoing are bent by the bending device, the knives 3 of the configurations and the dimensions to be formed are produced with a minimum amount of remaining throw-away material.

While a preferred embodiment of the present invention has been described in this specification, it is to be understood that the invention is illustrative and not restrictive, because various changes are possible within the spirit and indispensable features.

For example, as for the repository member 5, the storing portions 14 and knife materials 1 storable in each storing portion 14 can be freely changed in number. That is to say, the storing portions 14 can be changed in number by changing the number of the fitting depressed portions 12 at the base plates 11 of the repository member 5, and the storable knife materials 1 can be changed in number by changing the depth of the fitting depressed portions 12. Moreover, the distance between the base plates 11, 11 of the repository member 5 can be changed according to the length of the knife materials 1 to be used, and the width of the fitting depressed portions 12 (the length in the direction transversing the longitudinal direction of the knife materials 1) can be changed according to the width and other conditions of the knife materials 1 to be used.

The magnets 16 of the conveyance means 6, which are in plate configurations and are attached to the bottom surface of the traverse bar 15 in the preferred embodiment, can be freely changed in number, and the magnets can be permanent magnets or electromagnets.

The number of the cylinders 31 of the pushing mechanisms 30 can be three or more instead of two, and the pushing mechanisms 30 can be reciprocating motion mechanisms each provided with a screw shaft and a fitting nut member for the screw shaft instead of the cylinders 31.

Moreover, the rolls 32 of the receiving mechanism 7 and the rollers 38 of the inductive guidance mechanism 8 can be freely changed in number, and the cutting means 10 does not need to possess all of the four kinds of cutting cutters.

According to the present invention, a knife material 1 is taken from different kinds of knife materials 1, and the knife material 1 is gradually and certainly fed to the cutting means 10, to thereby produce an intermediate knife material 2 of a predetermined length. A knife of a configuration and dimensions to be formed can be therefore produced with high accuracy when the intermediate knife material 2 is bent by a bending device.

There is an advantage that complication of the installation as a whole can be avoided, because the knife material 1 is always kept horizontal and it is not necessary to change the direction of the knife material 1.

Especially when the installation is provided with the operation means 115 and the intermediate material length controlling means 116, knife materials 1 can be cut with high accuracy. The installation provided with the selecting means 117 and the controlling means 118 for curtailment of throw-away material excels in productivity because the amount of the remaining throw-away material after the knife materials 1 are cut by the cutting means 10 can be minimized in case many knives of different finished lengths are to be produced.

I claim:

1. An installation for cutting a knife material which cuts a knife material to a predetermined length with high accuracy in order to produce an intermediate knife material, wherein the installation comprises:

a repository member storing different kinds of knife materials assorted and piled horizontally;

a conveyance means adsorbing the horizontal knife materials at said repository member one by one from an uppermost material, conveying the knife material to a predetermined position keeping the knife material horizontal, and having pushing mechanisms which push and drop the knife material conveyed to the predetermined position;

a receiving mechanism horizontally receiving the knife material dropped by said pushing mechanisms, said receiving mechanism being provided with a plurality of rolls each having a horizontal axis;

an inductive guidance mechanism placing said knife material received by said receiving mechanism to a proper position and guiding a longitudinal traveling of said knife material, said inductive guidance mechanism being provided with a guide plate where a back side marginal portion of the knife material slides, and rollers each having a depressed groove in which the blade portion of the knife material is fitted and being able to reciprocate toward and away from said knife material on a horizontal plane;

a feeding mechanism feeding said knife material toward the longitudinal direction, said feeding mechanism being provided with a chuck member chucking the rear end portion of the knife material, a guide rail arranged to be parallel to the feeding direction of the knife materials, a shift member shifting along said guide rail and being connected to said chuck member, and a drive member making said shift member travel along the guide rail; and a cutting means cutting the knife material fed by said feeding mechanism to said predetermined length in order to produce said intermediate knife material.

2. An installation for cutting a knife material which cuts a knife material to a predetermined length with high accuracy in order to produce an intermediate knife material, wherein the installation comprises:

a repository member storing different kinds of knife materials assorted and piled horizontally;

a conveyance means adsorbing the horizontal knife materials at said repository member one by one from an uppermost material, conveying the knife material to a predetermined position keeping the knife material horizontal, and having pushing mechanisms which push and drop the knife material conveyed to the predetermined position;

a receiving mechanism horizontally receiving the knife material dropped by said pushing mechanisms, said receiving mechanism being provided with a plurality of rolls each having a horizontal axis;

an inductive guidance mechanism placing said knife material received by said receiving mechanism to a proper position and guiding a longitudinal traveling of said knife material, said inductive guidance mechanism being provided with a guide plate where a back side marginal portion of the knife material slides, and rollers each having a depressed groove in which the blade portion of the knife material is fitted and being able to reciprocate toward and away from said knife material on a horizontal plane;

a feeding mechanism feeding said knife material toward the longitudinal direction, said feeding mechanism being provided with a chuck member chucking the rear end portion of the knife material, a guide rail arranged to be parallel to the feeding direction of the knife materials, a shift member shifting along said guide rail and being connected to said chuck member, and a drive member making said shift member travel along the guide rail;

an operator for determining a value of said predetermined length of said intermediate knife material to be fed to a bending device on the basis of the configuration and finished length of the knife to be produced;

an intermediate material length controller adjusting a quantity of the knife material to be fed by said feeding mechanism on the basis of the value determined by said operator; and a cutting means cutting the knife material fed by said feeding mechanism to said predetermined length being controlled by said intermediate material length controller.

3. An installation for cutting a knife material which cuts a knife material to a predetermined length with high accuracy in order to produce an intermediate knife material, wherein the installation comprises:

a repository member storing different kinds of knife materials assorted and piled horizontally;

a conveyance means adsorbing the horizontal knife materials at said repository member one by one from an uppermost material, conveying the knife material to a predetermined position keeping the knife material horizontal, and having pushing mechanisms which push and drop the knife material conveyed to the predetermined position;

a receiving mechanism horizontally receiving the knife material dropped by said pushing mechanisms, said receiving mechanism being provided with a plurality of rolls each having a horizontal axis;

an inductive guidance mechanism placing said knife material received by said receiving mechanism to a proper position and guiding a longitudinal traveling of said knife material, said inductive guidance mechanism being provided with a guide plate where a back side marginal portion of the knife material slides, and rollers each having a depressed groove in which the blade portion of the knife material is fitted and being able to reciprocate toward and away from said knife material on a horizontal plane;

a feeding mechanism feeding said knife material toward the longitudinal direction, said feeding mechanism being provided with a chuck member chucking the rear end portion of the knife material, a guide rail arranged to be parallel to the feeding direction of the knife materials, a shift member shifting along said guide rail and being connected to said chuck member, and a drive member making said shift member travel along the guide rail;

a cutting means cutting the knife material fed by said feeding mechanism to said predetermined length;

a selecting means selecting a knife material from said knife materials of different lengths and a position to be cut on the basis of finished lengths and numbers of respective kinds of knives when many knives of different finished lengths are to be produced; and a controller instructing said conveyance means to adsorb and convey the knife material selected by said selecting means, instructing said feeding mechanism to adjust the quantity of the knife material to be fed by said feeding mechanism, and minimizing the amount of remaining throw-away material after the knife material is cut by said cutting means.

4. The installation for cutting a knife material as set forth in claim 1, 2, or 3, wherein the repository member is provided with a pair of parallel base plates which are at a predetermined distance, and a plurality of material fitting depressed portions forming openings, which openings face upward for fitting stacking bodies consisting of knife materials, said depressed portions being juxtaposed at said base plates along the longitudinal direction of the knife materials.

5. The installation for cutting a knife material as set forth in claim 1, 2, or 3, wherein the conveyance means is provided with a traverse bar horizontally reciprocating on a plane that intersects the feeding direction of the knife materials at right angles thereto and an adsorption plate, which ascends and descends freely, with magnets attached to the bottom surface thereof for adsorbing a knife material.

6. The installation for cutting a knife material as set forth in claim 5, wherein the pushing mechanisms of the conveyance means consist of cylinders each having a rod which projects downward lower than the bottom surfaces of the magnets under an expanding situation.

7. The installation for cutting a knife material as set forth in claim 1, 2, or 3, wherein the cutting means is provided with a notch cutter arranged at the upstream side and a plurality of cutters, which can be changed by reciprocating in a direction transversing the feeding direction of the knife materials at a right angle thereof, arranged at a downstream side of the installation.

8. The installation for cutting a knife material as set forth in claim 7, wherein a driving mechanism is provided in order to shift the notch cutter toward the direction transversing the feeding direction of the knife materials at a right angle thereof and form a chuck member passage.

* * * * *